United States Patent
Schevardo et al.

(10) Patent No.: US 7,186,012 B2
(45) Date of Patent: Mar. 6, 2007

(54) LIGHTING ELEMENT WITH A LIGHT EMITTING DIODE

(75) Inventors: Dirk-Achim Schevardo, Kainsbach (DE); Carsten Kohlmeier-Beckmann, Buxtehude (DE)

(73) Assignees: Diehl Luftfahrt Elektronik GmbH, Nürnberg (DE); Airbus Deutschland GmbH, Hamburg (DE)

( * ) Notice: Subject to any disclaimer, the term of this patent is extended or adjusted under 35 U.S.C. 154(b) by 52 days.

(21) Appl. No.: 10/888,277

(22) Filed: Jul. 9, 2004

(65) Prior Publication Data

US 2005/0018439 A1    Jan. 27, 2005

(30) Foreign Application Priority Data

Jul. 9, 2003    (DE) .................. 103 31 076

(51) Int. Cl.
    *F21V 7/04* (2006.01)
(52) U.S. Cl. ............... 362/555; 362/581; 362/310; 362/800
(58) Field of Classification Search ........ 362/555, 362/581, 267, 310, 470, 147, 365, 612, 615, 362/620, 619, 153, 804, 153.1; 200/314
    See application file for complete search history.

(56) References Cited

U.S. PATENT DOCUMENTS

| | | | |
|---|---|---|---|
| 3,582,638 A * | 6/1971 | Peters ................. | 362/577 |
| 4,370,532 A * | 1/1983 | Green ................. | 200/314 |
| 4,924,358 A * | 5/1990 | Von Heck ............ | 362/555 |
| 5,063,479 A * | 11/1991 | Satoh .................. | 362/555 |
| 5,647,623 A * | 7/1997 | Shiao ................. | 294/65.5 |
| 5,647,658 A | 7/1997 | Ziadi | |
| 5,938,321 A | 8/1999 | Bos et al. | |
| 5,988,842 A | 11/1999 | Johnsen et al. | |
| 6,203,180 B1 | 3/2001 | Fleischmann | |
| 6,520,666 B1 | 2/2003 | Beyerlein et al. | |
| 6,850,095 B2 * | 2/2005 | Sayers et al. ......... | 365/551 |
| 2002/0158153 A1 * | 10/2002 | Zieger et al. ........ | 239/548 |
| 2004/0051111 A1 * | 3/2004 | Ota et al. ............ | 257/98 |
| 2004/0057251 A1 | 3/2004 | Isaacson et al. | |

FOREIGN PATENT DOCUMENTS

| | | |
|---|---|---|
| DE | 296 13 798 U1 | 12/1996 |
| EP | 1 031 464 A2 | 8/2000 |
| EP | 1 293 382 A2 | 3/2003 |
| GB | 2 026 235 A | 1/1980 |
| JP | 02 301 902 A | 12/1990 |
| WO | 02/087781 A1 | 11/2002 |

* cited by examiner

*Primary Examiner*—Renee Luebke
*Assistant Examiner*—Gunyoung T. Lee
(74) *Attorney, Agent, or Firm*—Laurence A. Greenberg; Werner H. Stemer; Ralph E. Locher

(57) ABSTRACT

A lighting element has a light emitting diode that is installed in a light carrier. The lighting element has a light guide element that is optically coupled to the light emitting diode and the light guide element has a smaller light exit surface than the light emitting diode. With a plurality of such lighting elements it is possible to embody an effect lighting configuration for example in an aircraft cabin.

8 Claims, 1 Drawing Sheet

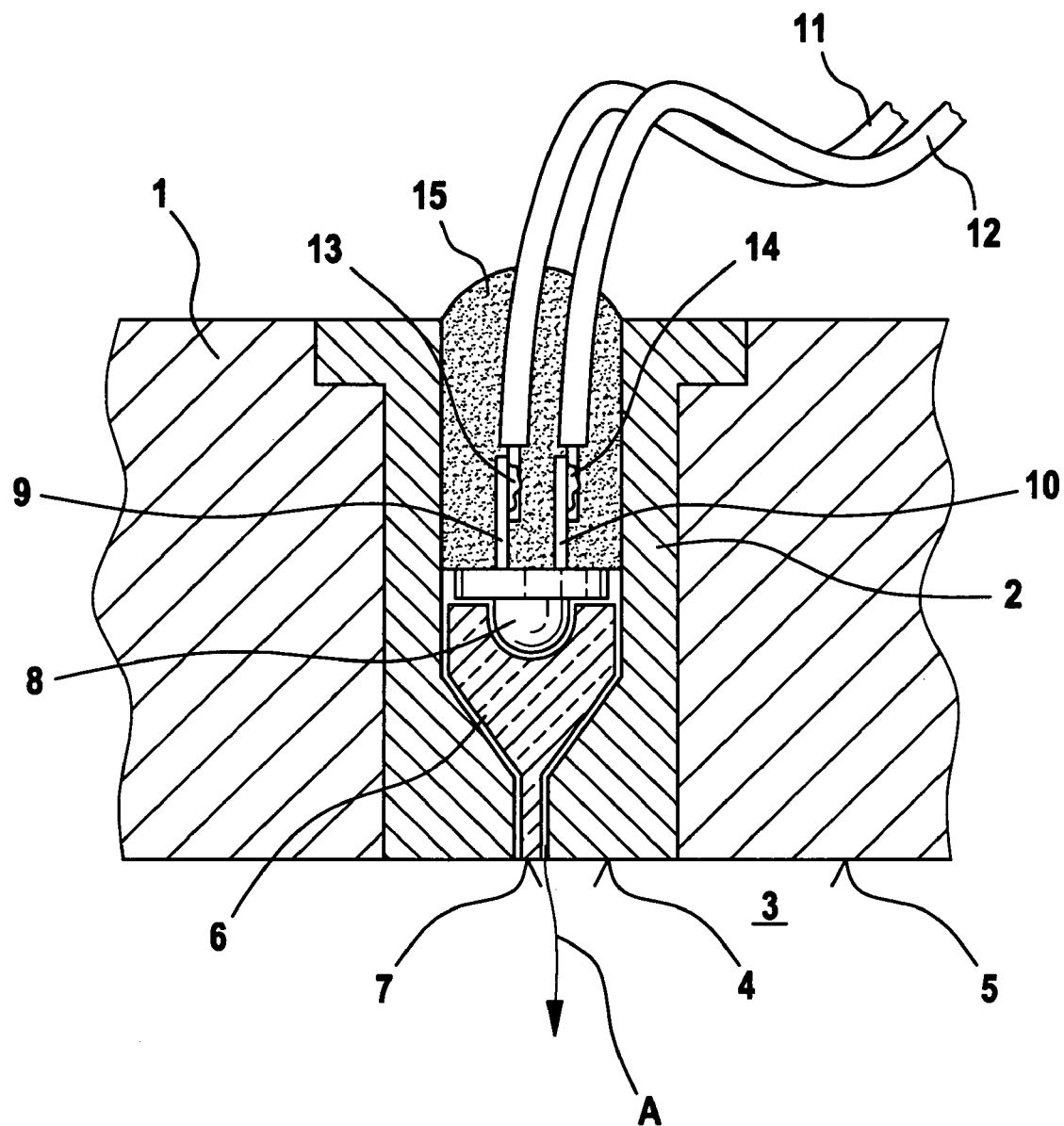

LIGHTING ELEMENT WITH A LIGHT
EMITTING DIODE

This application claims the priority, under 35 U.S.C. §119, of German patent application No. 103 31 076.2, filed Jul. 9, 2003; the entire disclosure of the prior application is herewith incorporated by reference.

BACKGROUND OF THE INVENTION

Field of the Invention

The invention concerns a lighting element with a light emitting diode which is installed in a light carrier.

Published, Non-Prosecuted German Patent Application DE 198 43 330 A1, corresponding to U.S. Pat. No. 6,203,180, discloses an aircraft cabin lighting configuration containing a plurality of light sources in point form which are mounted to or in the ceiling of the aircraft cabin. The light sources in point form have at least one light emitting diode which each irradiate their light directly into the interior of the aircraft cabin.

Published, Non-Prosecuted German Patent Application DE 196 32 699 A1 discloses an optical fiber-based orientation display in which light is applied to optical fibers by at least two light emitting diodes and surface changes at the longitudinal side of the optical fiber result in an emission of light in the form of dashes, lines, points, symbols and the like for the purposes of a marking effect.

Published, Non-Prosecuted German Patent Application DE 41 42 175 A1 describes a display device for aircraft, which has flat light guide elements, in the edge of which light emitting diodes are disposed in rows.

The lighting elements in accordance with the above-outlined state of the art suffer from the disadvantage that the lighting area thereof is of a given minimum size.

SUMMARY OF THE INVENTION

It is accordingly an object of the invention to provide a lighting element with a light emitting diode that overcomes the above-mentioned disadvantages of the prior art devices of this general type, whose lighting area is particularly small.

With the foregoing and other objects in view there is provided, in accordance with the invention, a lighting element. The lighting element contains a light emitting diode to be installed in a light carrier, and a light guide element optically coupled to the light emitting diode. The light guide element has a smaller light exit surface than the light emitting diode.

The core of the invention provides that the light of the light emitting diode is coupled into a light guide element and the light guide element has a light exit surface which is of any small size whatever but in any event is smaller than that of the light emitting diode.

Preferably the light guide element like the light emitting diode is installed in a light carrier and the light exit surface of the light guide element is disposed flush with the surface of the light carrier, thereby providing that the light exit surface is almost invisible when the light emitting diode is switched off. In addition it can be flat and/or additionally also of a roughened nature so that the light issues from the light guide element diffusely or also at a shallow angle.

In a preferred embodiment, the light guide element has a recess into which the light emitting diode can be fitted so that a large part of the light-emitting surface of the light emitting diode is enclosed by the light guide element and thus a large part of the light emitted by the light emitting diode is coupled into the light guide element. For optimizing the coupling of light into the light guide element, a coupling-in medium can be provided between the light emitting diode and the light guide element. Preferably however the light emitting diode is inserted in such a way that an air gap remains between it and the light guide element so that, in the event of pressure differences as occur in particular in use in aircraft, the light emitting diode is not expelled from the light guide element by air bubbles which are possibly enclosed.

For vibration damping purposes, the light emitting diode is cast with silicone in the light carrier, which provides a secure fixing effect, but in addition also permitting replacement of the light emitting diode.

In a development of the invention the light emitting diode and the light guide element are held in a sleeve or socket that is fitted in the light carrier. In that case the light exit surface of the light guide element, the end face of the sleeve and the surface of the light carrier are preferably oriented in flush relationship in order to make the light exit surface virtually invisible when the light emitting diode is switched off. The sleeve is glued in the light carrier and has passages that make it possible for excess adhesive to escape to the exterior of the light carrier.

In a preferred embodiment of the invention the ceiling or the wall of an aircraft cabin represents the light carrier, white light emitting diodes are used and/or a plurality of lighting elements form an effect lighting configuration.

Other features which are considered as characteristic for the invention are set forth in the appended claims.

Although the invention is illustrated and described herein as embodied in a lighting element with a light emitting diode, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, cross-sectional view through a ceiling or wall panel of an aircraft cabin with a lighting element installed therein according to the invention.

DESCRIPTION OF THE PREFERRED EMBODIMENTS

Referring now to the single FIGURE of the invention in detail, there is shown a sleeve 2 glued into a bore in a ceiling 1 of an aircraft cabin. An inside diameter of the sleeve 2 decreases in a direction toward an interior 3 of the aircraft cabin. A lower end 4 of the sleeve 2 is disposed flush with a surface 5 of the cabin ceiling 1, which faces towards the interior 3 of the aircraft cabin, and is painted just like that surface. A light guide body 6 is disposed in the lower region of the sleeve 2. The light guide body 6 contains a material that is transparent for light such as for example polycarbonate and its shape follows the interior of the sleeve 2 so that it tapers in the direction of the interior 3 of the aircraft cabin. A light exit surface 7 of the light guide body 6 is oriented flush with the end face 4 of the sleeve 2 and the surface 5 of the cabin ceiling 1 and in addition is of a roughened nature ('ground'). It can be of a circular, triangular or polygonal configuration or also in any other shape.

Formed on the side of the light guide body 6, which is opposite to the light exit opening 7, is a recess which is matched to the contour of a light emitting diode 8 and into which the light emitting diode 8 is inserted in such a way that the entire light-emitting surface of the light emitting diode 8 is surrounded by the light guide body 6 and in addition an air gap remains between the light emitting diode 8 and the light guide body 6. As there is also an air gap between the light guide element 6 and the sleeve 2 (possibly by suitably shaped passages), pressure equalization is possible between the region between the light emitting diode 8 and the light guide body 6 and the interior 3 of the aircraft cabin (see arrow A).

Connecting cables 11 and 12 are welded to the connecting leg portions 9 and 10 of the light emitting diode 8 by wire end sleeves 13 and 14. The light emitting diode 8 is connected to a current or voltage supply or a suitable control device by way of the connecting cables 11 and 12.

The space within the sleeve 2 above the light emitting diode 8 is filled with silicone 15 so that the light emitting diode 8 on the one hand is securely fixed in the sleeve 2 but also on the other hand if required can be removed and replaced.

The light of the light emitting diode 8 is coupled into the light guide body 6, passes to the exit surface 7 by virtue of total reflection and from the exit surface 7 radiates into the interior 3 of the cabin. As the light exit surface 7 can be selected to be very small—in particular also markedly smaller than the cross-sectional area of a light emitting diode 8—(the diameter being about 1 mm), it can scarcely be perceived by a person viewing it from the interior 3 of the cabin when the light emitting diode 8 is switched off while a bright light point is to be seen when the light emitting diode 8 is switched on. The light point can be clearly seen from all directions, that is to say also from very shallow viewing angles, by virtue of the roughening of the light exit surface 7. In that way, by the present invention, it is possible to provide an effect lighting system in an aircraft, which is not visible when the light emitting diode is switched off but which has a bright lighting point when the light emitting diode is switched on, wherein the light emitting diode 8 can be actuated with uniform brightness, flashing or also flickering (lighting up more brightly—lighting up more darkly).

We claim:

1. A lighting element, comprising:
   a light emitting diode being releasably fixed in a light carrier and defining a closed space above said light emitting diode, said light emitting diode having a light-emitting surface;
   a light guide element installed in the light carrier and optically coupled to said light emitting diode, said light guide element having a light exit surface being smaller than said light-emitting surface of said light emitting diode and being flush a surface of the light carrier, said light guide element having a recess formed therein being shaped for plugging-in said light emitting diode with a large part of said light-emitting surface of said light emitting diode being enclosed by said light guide element; and
   said light emitting diode and said light guide element defining an air gap therebetween.

2. The lighting element according to claim 1, wherein said light exit surface of said light guide element is at least one of flat and roughened.

3. The lighting element according to claim 1, further comprising silicone cast around said light emitting diode.

4. The lighting element according to claim 1, further comprising a sleeve installed in said light carrier, said light emitting diode and said light guide element are held in said sleeve.

5. The lighting element according to claim 4, wherein said sleeve is glued in the light carrier and has passages formed therein through which excess adhesive can escape to an exterior of the light carrier.

6. The lighting element according to claim 1, wherein the light carrier is a ceiling or wall of an aircraft cabin, said light emitting diode emits white light.

7. The lighting element according to claim 1, wherein the lighting element is part of a lighting configuration.

8. A lighting element, comprising:
   a light emitting diode to be installed in a light carrier;
   a light guide element optically coupled to said light emitting diode, said light guide element having a smaller light exit surface than said light emitting diode;
   a sleeve having an end face and being installed in the light carrier, said light emitting diode and said light guide element being held in said sleeve; and
   said light exit surface of said light guide element, said end face of said sleeve and a surface of the light carrier being flush.

* * * * *

UNITED STATES PATENT AND TRADEMARK OFFICE
Certificate

Patent No. 7,186,012 B2                 Patented: March 6, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dirk-Achim Schevardo, Kainsbach (DE); Carsten Kohlmeier-Beckmann, Buxtehude (DE); and Volker Müller, Burgrieden (DE).

Signed and Sealed this Second Day of February 2010.

SANDRA L. O'SHEA
*Supervisory Patent Examiner*
Art Unit 2875